US012421793B1

(12) United States Patent
Feng et al.

(10) Patent No.: US 12,421,793 B1
(45) Date of Patent: Sep. 23, 2025

(54) SAFETY GATE

(71) Applicant: Zhongshan Ekar Uping Houseware Co., Ltd, Zhongshan (CN)

(72) Inventors: Guozhu Feng, Foshan (CN); Jianghua He, Zhongshan (CN); Xinliang Ouyang, Jiujiang (CN)

(73) Assignee: Zhongshan Ekar Uping Houseware Co., Ltd, Zhongshan (CN)

( * ) Notice: Subject to any disclaimer, the term of this patent is extended or adjusted under 35 U.S.C. 154(b) by 0 days.

(21) Appl. No.: 18/669,406

(22) Filed: May 20, 2024

(30) Foreign Application Priority Data

May 14, 2024 (CN) ........................ 202421048664.0

(51) Int. Cl.
*E06B 9/04* (2006.01)
*E06B 9/00* (2006.01)

(52) U.S. Cl.
CPC .......... *E06B 9/04* (2013.01); *E06B 2009/002* (2013.01)

(58) Field of Classification Search
CPC .. E06B 2009/002; E06B 9/04; E05B 65/0007; E05B 65/0014
See application file for complete search history.

(56) References Cited

U.S. PATENT DOCUMENTS 6,016,629 A * 1/2000 Sylvester .................. E05D 7/12 49/55
6,056,038 A * 5/2000 Foster ....................... E06B 9/02 160/373
6,536,163 B1 * 3/2003 Monahan .................. E06B 9/04 292/336.3
10,024,080 B2 * 7/2018 Marsden ................. E05B 41/00
10,458,152 B2 * 10/2019 Schort ........................ E06B 9/00
10,683,699 B2 * 6/2020 Wang ......................... E06B 9/04
11,118,398 B2 * 9/2021 Kaiser ........................ E06B 9/04
11,149,488 B2 * 10/2021 Wang ......................... E06B 9/04
11,174,675 B1 * 11/2021 Flannery ................... E06B 9/06
11,767,711 B2 * 9/2023 Flannery ................... E05D 3/08 49/149
2010/0290830 A1 * 11/2010 Cheng ........................ E06B 9/02 403/289
2013/0160365 A1 * 6/2013 Flannery ............... E06B 11/022 49/50
2015/0089873 A1 * 4/2015 Marsden ................... E06B 9/04 49/56
2015/0101250 A1 * 4/2015 Marsden ............... E06B 9/0623 49/55

(Continued)

*Primary Examiner* — Justin B Rephann
(74) *Attorney, Agent, or Firm* — Olive Law Group, PLLC

(57) ABSTRACT

A safety gate, includes a door frame, a door rail mechanism, and a handle mechanism, wherein the door rail mechanism includes: two door bodies and adjustment components; the two door bodies are overlapped front and back, one side of one door body is hinged with the door frame, and the handle mechanism is arranged on other door body; the two door bodies are provided with a plurality of fixing holes matching to each other at intervals along width direction. The adjustment components pass through the fixing holes on two door bodies in sequence and are detachably connected with the fixing holes. By the means of changing the position of the adjustment components in the fixing holes of the door bodies, width of two door bodies in left and right directions can be changed randomly, so that the applicable range is wider.

13 Claims, 10 Drawing Sheets

(56) References Cited

U.S. PATENT DOCUMENTS

| | | | | |
|---|---|---|---|---|
| 2017/0058595 | A1* | 3/2017 | Marsden | E05B 41/00 |
| 2017/0211314 | A1* | 7/2017 | Raffi | E06B 9/04 |
| 2017/0350165 | A1* | 12/2017 | Schort | E05B 65/0007 |
| 2018/0274288 | A1* | 9/2018 | Wang | E06B 9/04 |
| 2019/0003250 | A1* | 1/2019 | Flannery | E06B 11/02 |
| 2019/0085620 | A1* | 3/2019 | Wang | E06B 9/02 |
| 2020/0063488 | A1* | 2/2020 | Wang | E05B 65/0007 |
| 2020/0340295 | A1* | 10/2020 | Wang | E05B 65/0014 |
| 2021/0079700 | A1* | 3/2021 | Wang | E05D 3/02 |
| 2021/0348420 | A1* | 11/2021 | He | E05B 45/06 |
| 2021/0348441 | A1* | 11/2021 | He | E05B 65/0007 |

* cited by examiner

SAFETY GATE

TECHNICAL FIELD

The present utility patent relates to the technical field of door rail, particular to an adjustable width safety gate.

BACKGROUND

A safety gate is used for enclosing children or pets within a certain space and preventing them from entering dangerous areas, such as kitchens, stairs or bathrooms. The user can use the door body to limit the activity scope of children. The safety gate can be installed at entrances and exits connected to restricted areas such as kitchens and stairwells.

However, the size of the existing safety gates on the market is usually fixed. Due to different widths of doors, customization is often required when install the door body, which makes the applicability of the safety gates poor and leads to a longer installation cycle of the safety gates. For example, the safety gate disclosed in Chinese utility model patent CN215979149U includes a door frame, a door body and a handle mechanism. The door body is used to close the door frame. One part of the handle mechanism is arranged on the door body and other part is arranged on the door frame. The door body can rotate relative to the door frame. The handle mechanism locks or unlocks the door frame through the handle mechanism.

SUMMARY OF THE PRESENT UTILITY PATENT

In order to overcome at least one defect of the above-mentioned prior art, the present utility patent provides a safety gate. By the means of changing the position of the adjustment component in the fixing hole of the door body, width of the two door bodies in left and right directions can be changed randomly, so that the applicable scope of the safety gate is wider.

In order to achieve the above purpose, the technical solution adopted by the present utility patent is: a safety gate, including a door frame, a door rail mechanism and a handle mechanism, wherein one side of the door rail mechanism is hinged with the door frame; the door rail mechanism is detachably connected with the door frame through the handle mechanism; the door rail mechanism includes: two door bodies and adjustment components; one door body is overlapped with the other door body when two door bodies are in draw back state; one side of one door body is hinged with the door frame, and the handle mechanism is arranged on the other door body; the two door bodies are provided with a plurality of fixing holes matching to each other at intervals along width direction; the adjustment components pass through the fixing holes of the two door bodies in sequence and are detachably connected with the fixing holes.

Adopting the above technical solutions, the beneficial effect of the present utility patent is: the two door bodies are arranged in parallel, one door body is overlapped with the other door body when two door bodies are in draw back state, and the two door bodies are close to each other. One side of one door body is hinged to the door frame, and the handle mechanism is arranged on the other door body; two door bodies are provided with a plurality of fixing holes matching to each other at intervals along width direction, and a height of the fixing holes on the two door bodies are correspond to each other, which achieves that the adjustment components pass through the fixing holes on the two door bodies in sequence and are detachably connected to the fixing holes. By the means of changing the position of the adjustment components in the fixing holes of the door bodies, the width in left and right directions of the two door bodies can be changed randomly, which makes the applicable scope of the safety gate is wider, so that the safety gate can be purchased and used directly without additional customization, saving installation time.

BRIEF DESCRIPTION OF THE FIGURES

In order to more clearly illustrate the embodiment of the present utility patent or the technical solution of the prior art, a brief introduction of the figures that need to be used in the embodiment or the description of the prior art will be given below, apparently, the figures in the following description are only some embodiments of the present utility patent, for those technicians skilled in the art, on the basis of no inventive efforts, other figures can also be obtained based on these figures.

Figure 1:
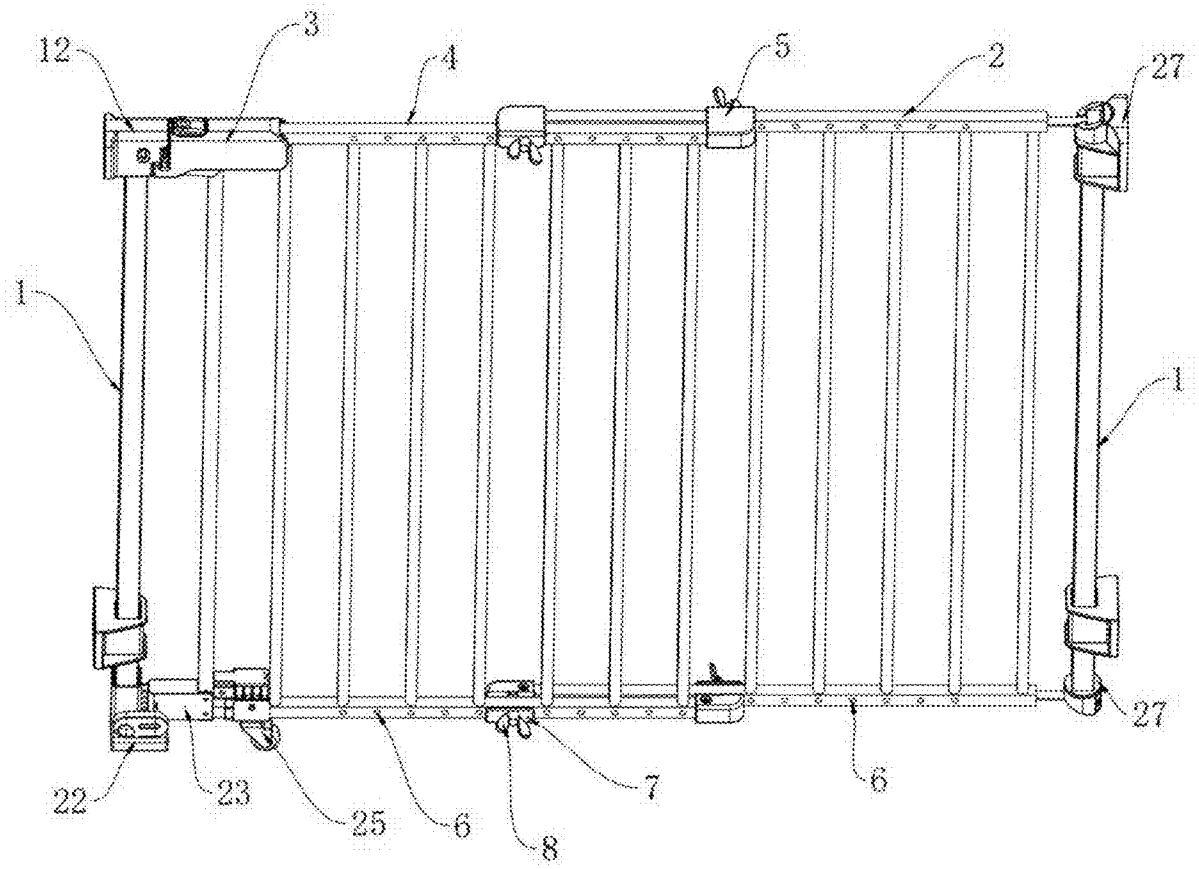
FIG. 1 is a schematic structural diagram of the present utility patent.

Reference signs in the figures: 1. door frame; 2. door rail mechanism; 3. handle mechanism; 4. door body; 5. adjustment component; 6. fixing hole; 7. fixed base; 8. bolt structure; 9. guiding groove; 10. first threaded hole; 11. pocket hole; 12. fixing sleeve; 13. handle; 14. spring buckle; 15. button; 16. return spring; 17. sliding groove; 18. slope; 19. inclined surface; 21. limiting convex block; 22. limiting sleeve; 23. limiting slider; 25. wheel; 26. hinge shaft; 27. rotating shaft sleeve; 32. strip hole; 33. positioning groove; 34. positioning column; 35. installation head; 37. through hole; 38. rotating screw; 39. nut; 40. pressing piece; 41. inserting rod; 42. triangular groove; 43. sliding rod; 44. first connecting piece; 45. second connecting piece; 46. elastic piece.

DETAILED DESCRIPTION OF THE EMBODIMENTS

Below is a further detailed description of the present utility patent based on the figures.

This embodiment only shows an explanation of the present utility patent and it is not a limitation to the present utility patent. The skilled in the art can make modifications to this embodiment as needed without making any creative contributions after reading this specification, which are always protected by the patent law as long as they are within the scope of the claims of the present utility patent.

It should be noted that when an element is called as being "fixed to" or "arranged on" other element, it can be directly on the other element or indirectly on the other element. When an element is called as being "connected to" other element, it can be directly connected to the other element or indirectly connected to the other element.

It should be noticed that the terms "length", "width", "above", "below", "front", "rear", "left", "right", "vertical", "horizontal", "top", "bottom", "inside" and "outside" which indicates the orientations or positional relationships are based on the orientations or positional relationships shown in the figures. They are only for facilitating describing the present utility patent and simplifying the description, rather than indicating or implying that the device or component must have a specific orientation, construct and operate in a specific orientation, therefore, it understood as a limitation of the present utility patent.

In addition, the terms "first" and "second" are used for descriptive purposes only and cannot be understood as indicating or implying relative importance or implicitly indicating the quantity of indicated technical features. Therefore, a feature defined as "first" and "second" may explicitly or implicitly include one or more of these features. In the description of the present utility patent, "a plurality of" means two or more, unless otherwise specifically defined.

This embodiment relates to a safety gate, as shown in FIGS. 1 to 10, including a door frame 1, a door rail mechanism 2 and a handle mechanism 3, wherein one side of the door rail mechanism is hinged with the door frame 1, the door rail mechanism 2 is used for closing the door frame 1, and the door rail mechanism 2 is detachably connected with the door frame 1 through the handle mechanism 3. The door rail mechanism 2 includes: two door bodies 4 and adjustment components 5. One door body 4 is overlapped with the other door body 4 when two door bodies 4 are in draw back state; the two door bodies 4 are arranged in parallel and close to each other. One side of the door body 4 is hinged with the door frame 1, and the handle mechanism 3 is arranged on the other door body 4. The two door bodies 4 are provided with a plurality of fixing holes 6 matching to each other at intervals along a width direction. The height of fixing holes 6 on the two door bodies 4 is corresponding to each other, which achieves that the adjustment components 5 pass through the fixing holes 6 on the two door bodies 4 in sequence, and are detachably connected with the fixing holes 6. By the means of changing the position of the adjustment component 5 in the fixing holes 6 of the door bodies 4, the width in the left and right directions of the two door bodies 4 can be changed randomly, so that the applicable scope of the safety gate is wider, and the safety gate can be purchased and used directly without need of additional customization and saves installation time.

Preferably, as shown in FIGS. 1 to 4, at least two adjustment components are provided; at least one adjustment component 5 is arranged at an upper side of the door rail mechanism 2; at least one adjustment component 5 is arranged at a lower side of the door rail mechanism 2, so that the effect of the two door bodies 4 being parallel and fitted to each other is better, and the fixation between the two door bodies 4 is more stable.

Optionally, as shown in FIGS. 1 to 4, each adjustment component 5 includes: a fixed base 7 and a bolt structure 8. The fixed base 7 is fixed on one door body 4. The fixed base 7 is provided with a guiding groove 9. One side of the other door body 4 is inserted into the guiding groove 9 and is capable of moving in the guiding groove 9 along a width direction and relative to the fixed base 7. The fixed base 7 is provided with a first threaded hole 10 on one side of the guiding groove 9 that can be opposite to the fixing hole 6, and the first threaded hole 10 is concentrically arranged with a fixing hole 6 of the door body 4 that is not in the guiding groove 9. The bolt structure 8 passes through the first threaded hole 10 and the two fixing holes 6 in sequence and meshes with the first threaded hole 10. The fixed base 7 is fixed at an upper or lower side of one door body 4, and an upper or lower side of the other door body 4 is inserted into the guiding groove 9 and is capable of moving from left to right along a width direction in the guiding groove 9, which achieves that the user only needs to pull one door body 4 from left to right when adjusting a width of the door rail mechanism 2, and achieves the alignment of the first threaded hole 10 on the fixed base 7 and the fixing hole 6 on the door body 4, thereby achieving the effect of adjusting the door rail mechanism 2 to a suitable width.

Specifically, the bolt structure 8 includes a screw part and a hand-tightening part. One end of the screw part is fixedly arranged on the hand-tightening part. Size of the hand-tightening part is larger than size of the first threaded hole 10. One end of the screw part penetrates through the first threaded hole 10, the fixing hole 6 of one door body 4 and the fixing hole 6 of the other door body 4 in sequence. The bolt structure 8 is a hand-tightened bolt.

Optionally, as shown in FIGS. 1 to 4, the fixed base 7 is provided with an installation cavity parallel to the guiding groove 9. One end of upper or lower side of one door body 4 is inserted into the installation cavity, and upper or lower side of the other door body 4 is limited in the guiding groove 9. A pocket hole 11 is arranged on the fixed base 7 and is located between the two door bodies 4. The pocket hole 11 and the first threaded hole 10 are respectively located at two sides of the guiding groove 9 and are set at the same straight line. The bolt structure 8 penetrates through the first threaded hole 10, the fixing hole 6 on one door body 4, the pocket hole 11 and the fixing hole 6 on the other door body 4 in sequence.

Preferably, one end of upper or lower side of the door body 4 is inserted into the installation cavity and is fixed by screws. The installation cavity is provided with a concave groove concentrically arranged with the pocket hole 11 and the first threaded hole 10, and one end of the bolt structure 8 penetrates through the first threaded hole 10, the fixing hole 6 of one door body 4, the pocket hole 11, and the fixing hole 6 of the other door body 4 in sequence, and then abuts into the concave groove, which achieves the reliability of the connection between the two door bodies 4. Specially, one end of one door body 4 is sleeved and connected with the installation cavity.

In one embodiment, the fixing holes 6 are arranged on upper and lower sides of the door body 4, and adjustment component 5 is provided with two. The fixing bases 7 of the two adjustment components 5 are respectively fixed on upper and lower ends of a right side of the door body 4 with the handle mechanism 3, or the fixing base 7 of the two adjustment components 5 are respectively fixed on upper or lower ends of a left side of the door body 4 without handle mechanism 3. In some embodiments, the two door bodies 4 are respectively a first door body and a second door body, the door body 4 with the handle mechanism 3 is the first door body and the other door body 4 is the second door body, One fixed base 7 is fixed at an upper end of a right side of the first door body or upper end of a left side of the second door body, and the other fixed base 7 is fixed at a lower end of a right side of the first door body or a lower end of a left side of the second door body.

In one embodiment, the adjustment components 5 are provided with four. Two adjustment components 5 are respectively fixed on upper and lower ends of a left side of one door body 4 which is the first door body, and other two adjustment components 5 are respectively fixed on upper and lower ends of a right side of the other door body 4 which is the second door body.

Optionally, as shown in FIGS. 1 to 8, the handle mechanism 3 includes: a fixing sleeve 12, a handle 13, a spring buckle 14, a button 15 and a return spring 16. The fixing sleeve 12 is installed at an upper end of one side of the door frame 1, and the handle 13 is fixedly arranged on one door body 4. A sliding groove 17 is arranged on one side of the handle 13 close to the fixing sleeve 12. The spring buckle 14 is arranged in the sliding groove 17 and one end of the spring buckle 14 can extend out of the sliding groove 17 and is detachably connected to the fixing sleeve 12. The button 15 is slidingly installed on the handle 13 and one end is abutted against the spring buckle 14. The button 15 is used for pushing the spring buckle 14 to retract into the sliding groove 17 and compressing the return spring 16, so that the spring buckle 14 is separated from the fixing sleeve 12. The return spring 16 is arranged in the sliding groove 17, and both ends of the return spring 16 are fixedly connected to the spring buckle 14 and the handle 13 respectively. In this embodiment, an inserting groove is arranged on one side of the fixing sleeve 12. When the door rail mechanism 2 closes the door frame 1, one end of the spring buckle 14 extends out of the sliding groove 17 and inserts into the inserting groove on the fixing sleeve 12 under the action of the return spring 16 and achieves to close the door frame 1 by the door rail mechanism 2, which prevents the door rail mechanism 2 from rotating to open the door frame 1. Specially, the handle is located on the first door body.

Figure 8:
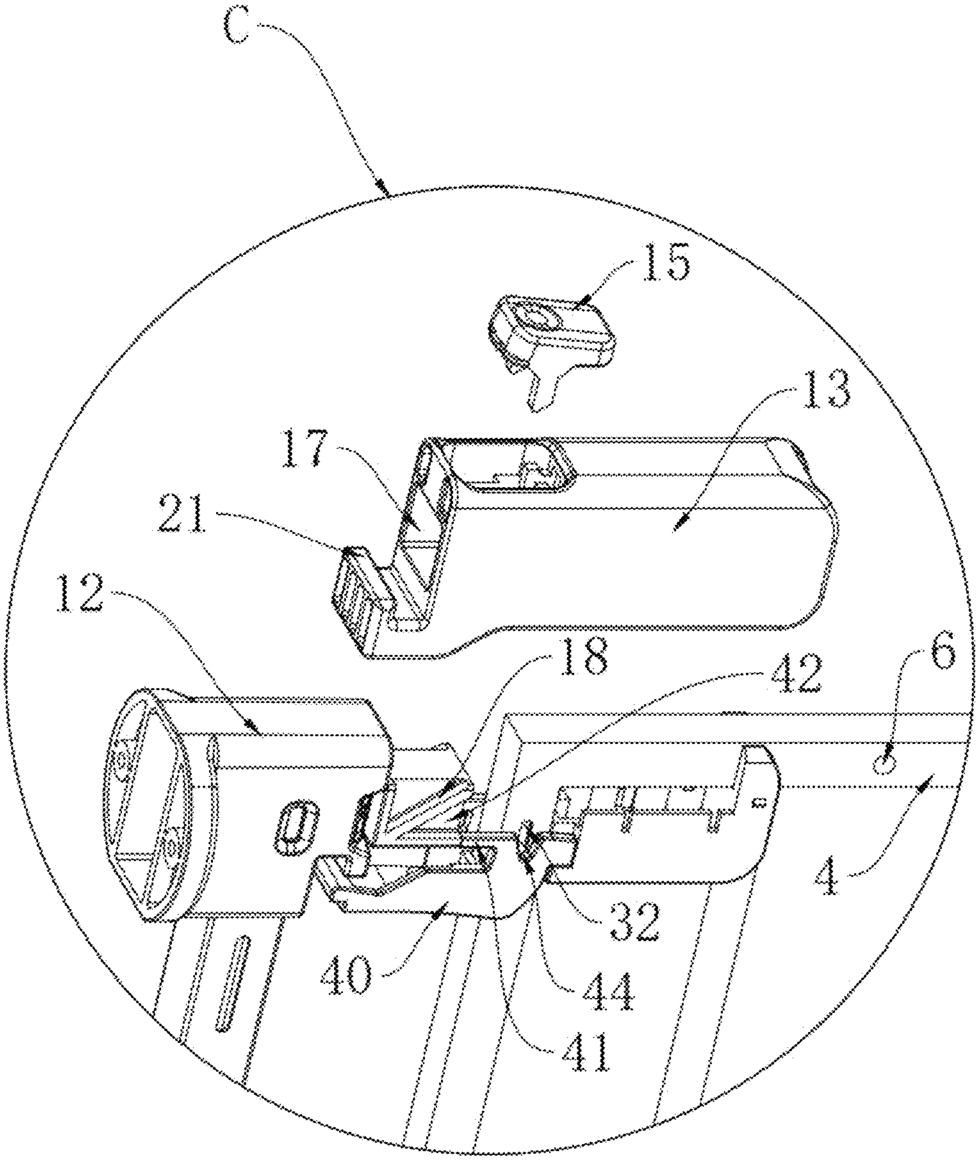
FIG. 8 is an exploded diagram of C in FIG. 7.
Figure 9:
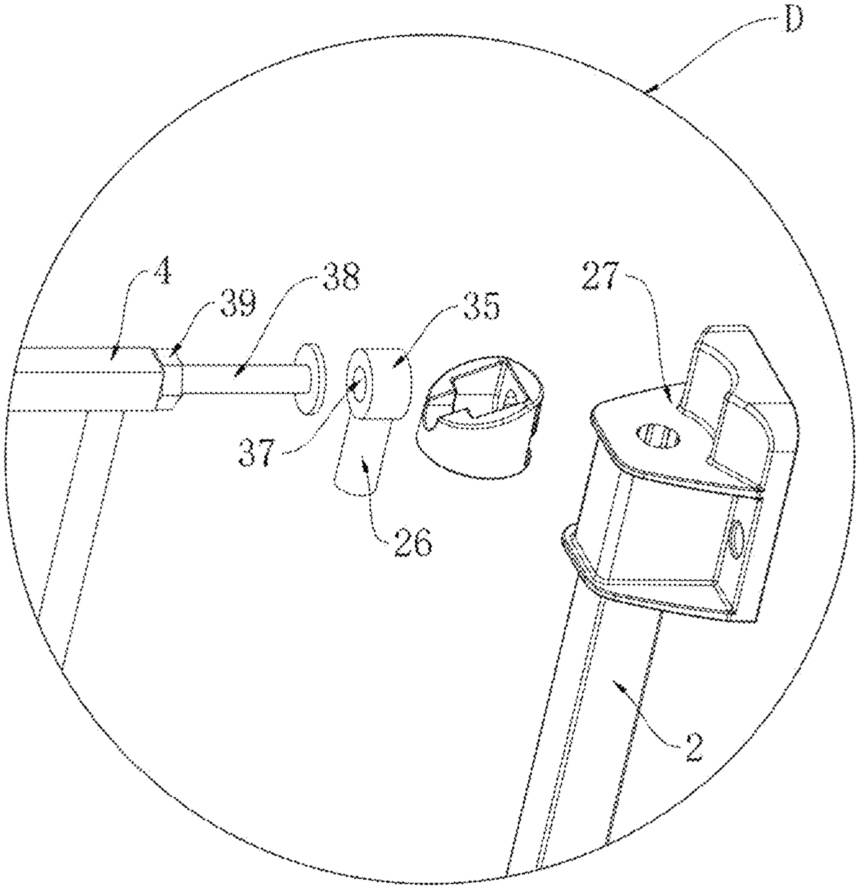
FIG. 9 is an exploded diagram of D in FIG. 7.
Figure 10:
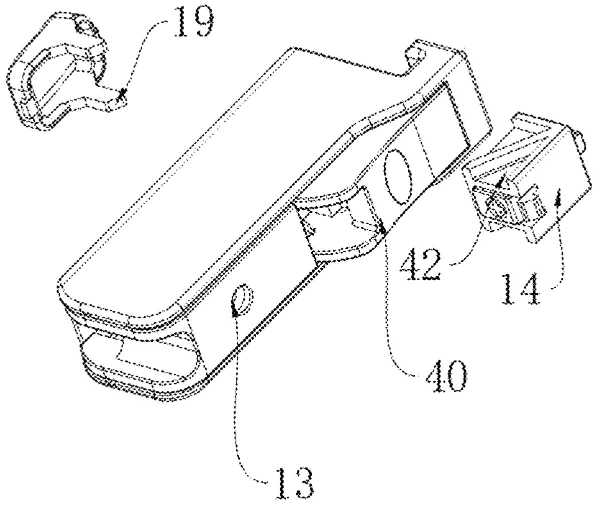
FIG. 10 is an exploded diagram of the handle.

Optionally, as shown in FIGS. 7 to 10, in order to achieve that the button pushes the spring buckle 14 to retract into the sliding groove 17, both sides of the spring buckle 14 are provided with a slope, and two sides of lower end of the button 15 are provided with an inclined surface 19 to abut against the slope 18. As shown in FIG. 8, height of the slope 18 gradually increases from left to right.

Preferably, front and back sides of the spring buckle 14 are respectively provided with a triangular groove 42. The triangular groove 42 is located below the slope 18. The handle mechanism 3 further includes: a pressing piece 40 and an elastic piece 46. The pressing piece 40 is arranged on a lower side of the handle 13. The elastic piece 46 is arranged in the handle 13 to provide restoring force for resetting of the pressing piece 40, and the elastic piece 46 is a spring. The pressing piece 40 is provided with an inserting rod 41. One end of the inserting rod 41 is capable of abutting against right side of the spring buckle 14 or is capable of inserting into the triangular groove 42.

When the safety gate needs to be opened, the user can press the pressing piece 40 upwards to release the contact between the inserting rod 41 and the spring buckle 14, and then press the button 15 downwards, the inclined surface 19 of the button 15 is acted on the slope 18 of the spring buckle 14 to push the spring buckle 14 moving towards one side (right side) of the return spring 16 to compress the return spring 16, and promotes the inserting rod 41 to be inserted into the triangular groove 42 so that the spring buckle 14 retracts into the sliding groove 17, thereby achieving the unlocking function.

Further, in order to achieve a more stable closing state between the door rail mechanism 2 and the door frame 1, a movable groove is arranged in the door body 4 along a vertical direction, and side walls of upper and lower ends of the door body 4 are provided with a stripe holes 32 connected with the movable groove. The handle mechanism 3 further includes: a sliding rod 43, a first connecting piece 44, a limiting sleeve 22, a second connecting piece 45 and a limiting slider 23. The sliding rod 43 is slidingly assembled in the movable groove up and down. The elastic piece 46 is arranged in the movable groove and located in the handle 13. The elastic piece 46 is a spring. At the same time, the elastic piece 46 is located at an upper end of the sliding rod 43. The first connecting piece 44 is slidingly assembled in the strip hole 32 at an upper end of the door body 4. The first connecting piece 44 is connected to an upper end of the sliding rod 43 and the pressing piece 40 respectively. The limiting sleeve 22 is arranged at a lower end of the door frame 1. The limiting sleeve 22 is located at the same side as the fixing sleeve 12. A limiting groove is arranged on the limiting sleeve 22. The limiting slider 23 is slidingly arranged at the lower end of the door body 4. The second connecting piece 45 is slidingly assembled in the strip hole 32 at a lower end of the door body 4. The second connecting piece 45 is connected to a lower end of the sliding rod 43 and the limiting slider 23 respectively. The limiting slider 23 is capable of inserting with or separating from the limiting groove driven by the sliding rod 43. Specially, the elastic piece 46, the movable groove, the sliding rod 43, the strip hole 32, the limiting slider 23, the first connecting piece 44, and the second connecting piece 45 are all located at left side of the first door body.

Further, a positioning groove 33 is arranged at the bottom of the left side of the limiting slider 23. A positioning column 34 that is capable of inserting into the positioning groove 33 protrudes upwards on the limiting sleeve 22 and at the bottom of the limiting groove 33.

It should be noted that when the pressing piece 40 is pressed upwards, the pressing piece 40 drives the sliding rod 43 to move upwards through the first connecting piece 44, and the sliding rod 43 drives the limiting slider 23 to slide upwards through the second connecting piece 45. At the same time, the pressing piece 40 moves upwards to release the contact between the inserting rod 41 and the spring buckle 14, and then press the button 15 downwards, the inserting rod 41 is inserted into the triangular groove 42 to achieve that the spring buckle 14 retracts into the sliding groove 17, so as to facilitate the limiting slider 23 being separated from the limiting groove when the safety gate is opened, or to facilitate the alignment of the limiting slider 23 and the limiting groove during the closing process. When the handle 13 is released, the elastic piece 46 pushes the sliding rod 43 to slide downwards under its own restoring force, and the sliding rod 43 drives the limiting slider 23 to slide downwards for resetting through the second connecting rod, so that the limiting slider 23 is inserted into the limiting groove during the closing process, thereby completing the locking of lower end of the door rail mechanism 2 and lower end of the door frame 1. The sliding rod 43 drives the pressing piece 40 to reset through the first connecting rod, and the spring buckle 14 extends out of the sliding groove 17 under the restoring force of the return spring 16 and can be inserted into the fixing sleeve 12, thereby completing the locking of upper end of the door rail mechanism 2 and upper end of the door frame 1. The operation is simple and it achieves the function of linkage unlocking of upper and lower ends of the door rail mechanism 2 and the door frame 1.

Figure 2:
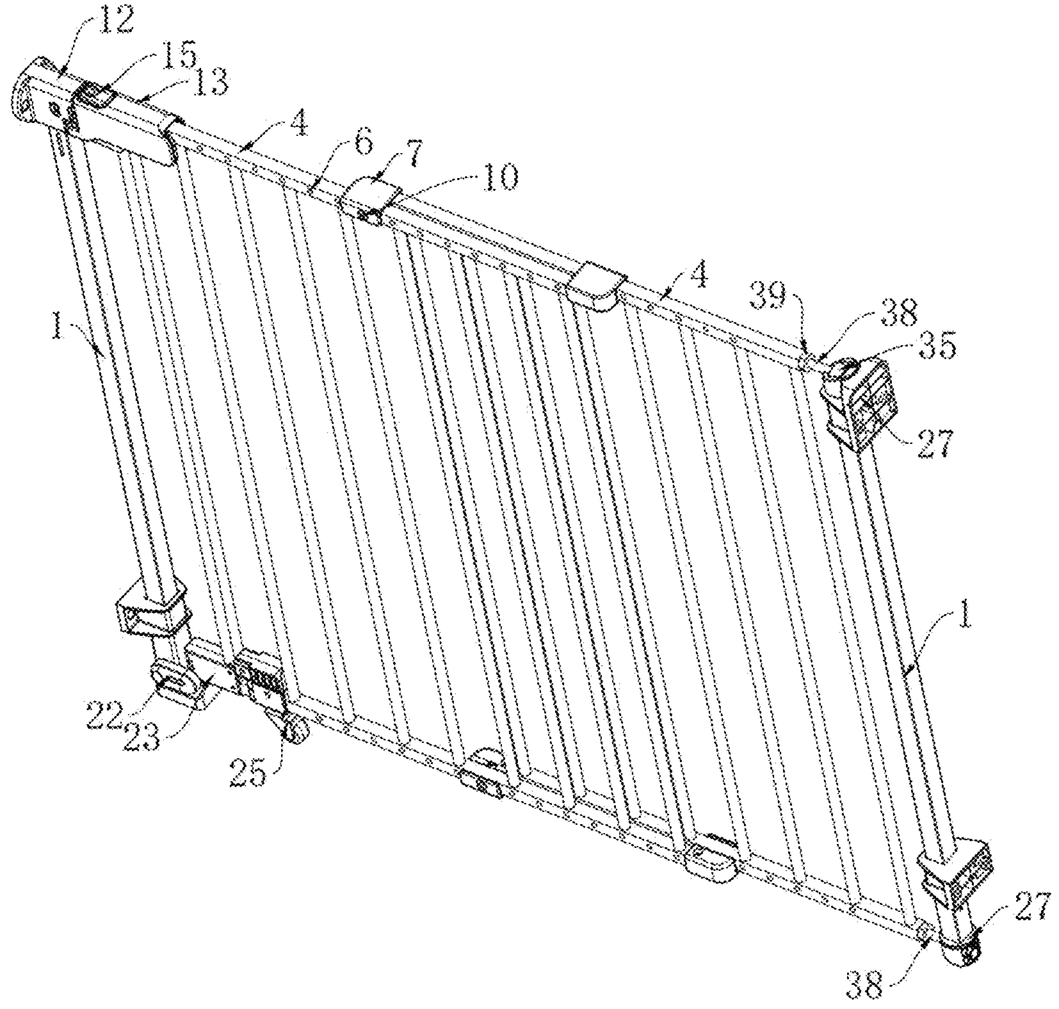
FIG. 2 is a schematic structural diagram of the present utility patent without the bolt structure.
Figure 3:
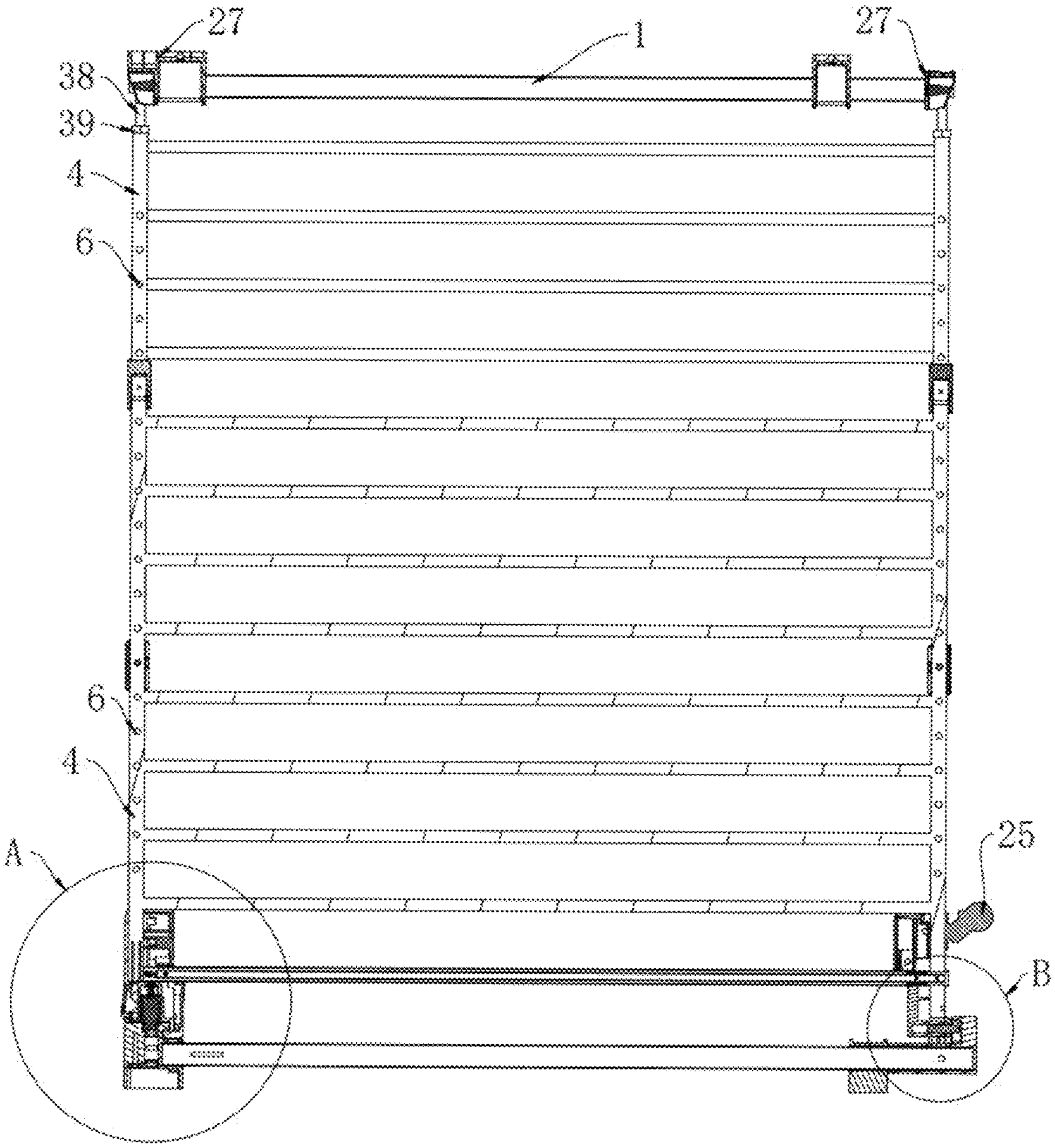
FIG. 3 is a cross-sectional view of the present utility patent.
Figure 4:
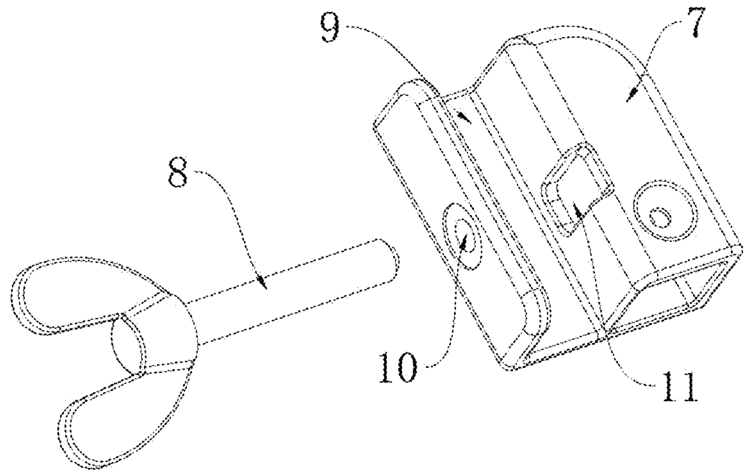
FIG. 4 is an exploded schematic diagram of the adjustment component of the present utility patent.
Figure 5:
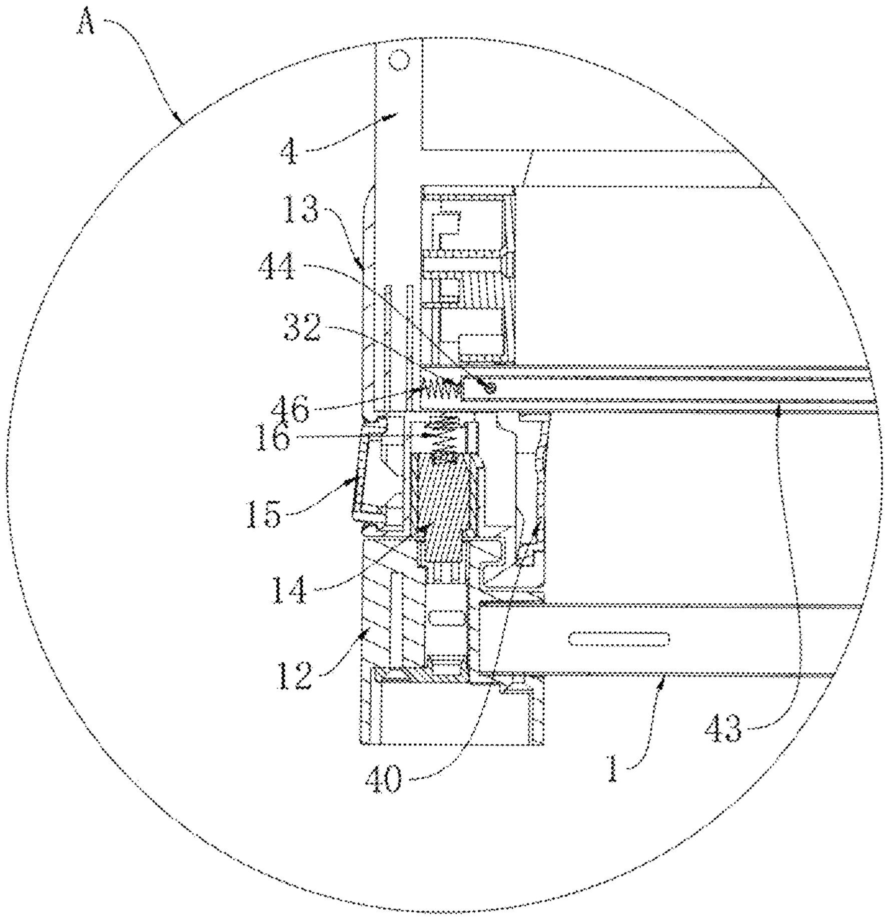
FIG. 5 is an enlarged schematic diagram of A in FIG. 3.
Figure 6:
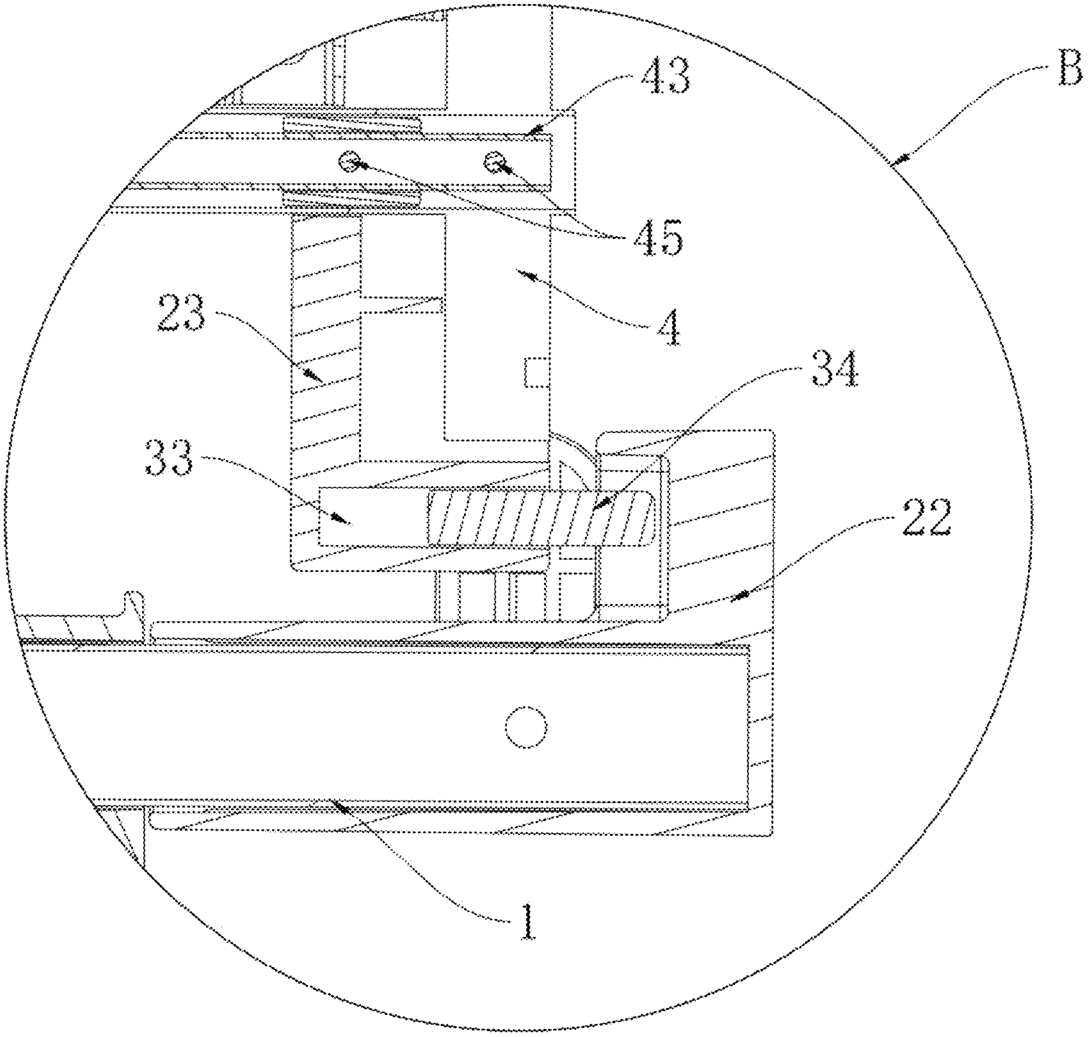
FIG. 6 is an enlarged schematic diagram of B in FIG. 3.
Figure 7:
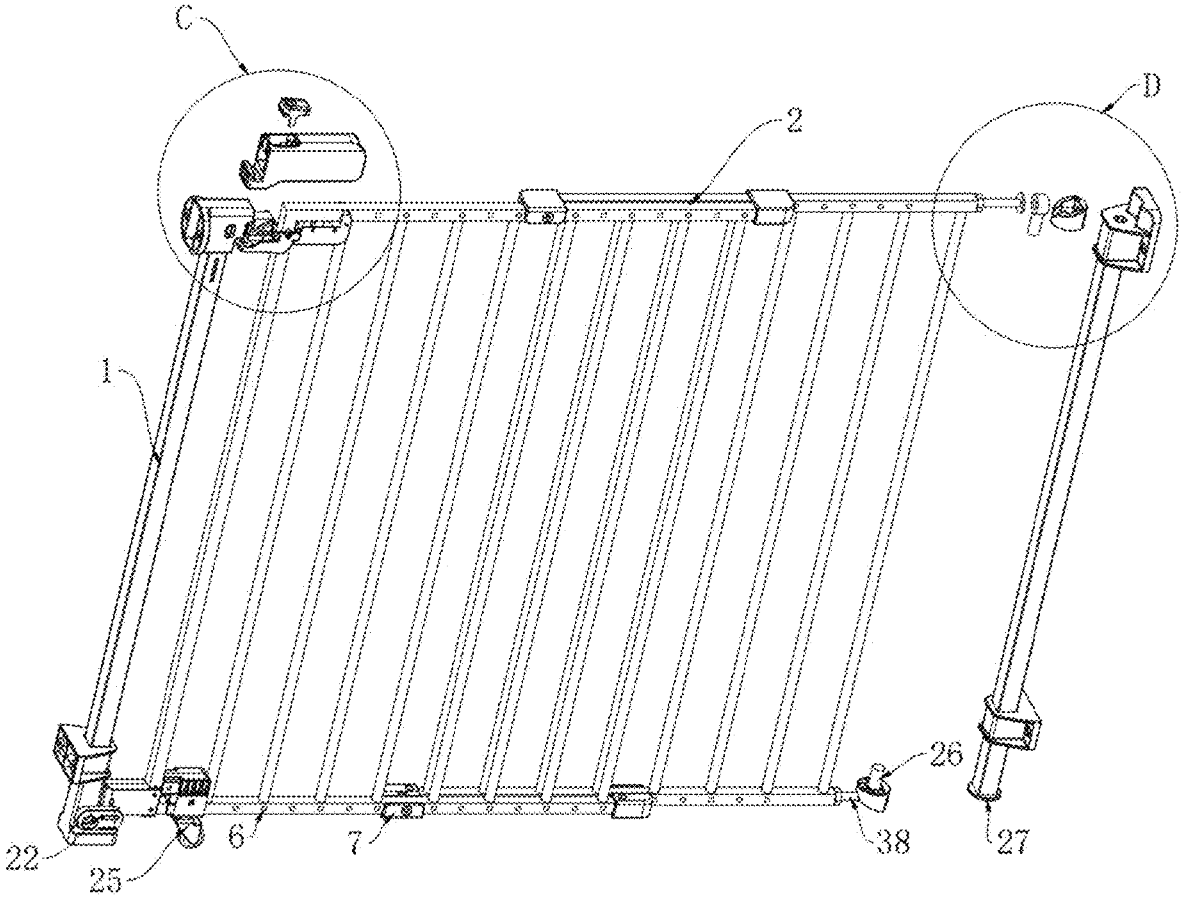
FIG. 7 is an exploded schematic view of the present utility patent without the bolt structure.

Optionally, as shown in FIGS. 1 and 2, the door frame 1 includes: two brackets arranged at intervals, the fixing sleeve 12 is arranged at an upper end of one bracket, and upper and lower ends of the door body 4 without the handle mechanism 3 are respectively hinged with upper and lower ends of the other bracket. The fixing sleeve 12 and the rotating shaft sleeve 27 are respectively arranged at ends of the two brackets. Specially, the two brackets are a first bracket and a second bracket. The fixing sleeve 12 is fixed at an upper end of the first bracket, and right side of the second door body is hinged with the second bracket.

Further, in order to facilitate the user to adjust width of the door rail mechanism 2 according to width of the door frame where the safety gate needs to be installed, a limiting hole penetrates through the bottom of the fixing sleeve 12, and a limiting convex block 21 that is capable of inserting into the limiting hole is arranged on the bottom of the handle 13. The limiting convex block 21 is hooked with the limiting hole so as to synchronously drive the bracket and one door body 4 to move relative to the other door body 4, thereby achieving more accurate installation of the door frame of the safety gate on the door frame of external space.

Specifically, as shown in FIGS. 1, 2, 7, and 9, in order to achieve the hinge between the door rail mechanism 2 and the door frame 1, upper and lower ends of the right side of one door body 4 are provided with the second threaded holes, the handle mechanism 3 is arranged on an upper end of left side of the other door body 4, and rotating shaft sleeves 27 are arranged on upper and lower ends of a right side of the door frame 1. The rotating shaft sleeve 27 is rotatably assembled (pivoting) with a hinge shaft 26. The hinge shaft 26 is capable of horizontally rotating relative to the rotating shaft sleeve 27. One end of the hinge shaft 26 is provided with an installation head 35, and the installation head 35 is limited outside the rotating shaft sleeve 27. The installation head 35 is provided with a through hole 37. The safety gate further includes: a rotating screw 38. One end of the rotating screw 38 penetrates through the through hole 37 and then meshes with the second threaded hole. A right end of the rotating screw 38 is limited outside the through hole 37. The rotating screw rod 38 is vertical to the hinge shaft 26. The fine adjustment of distance between the handle 13 and the fixing sleeve 12 can be achieved by turning the rotating screw 38. In some embodiments, the rotating screw 38 is covered with a nut 39 that meshes with the rotating screw 38. An operating groove is arranged on right side of the rotating screw 38, and the operating groove can be hexagonal, cross-shaped or straight-shaped. Specially, the second threaded holes are located at upper and lower ends of a right side of the second door body. The handle mechanism is located at left side of the first door body.

It should be noted that when the safety gate is installed on the external door frame and the distance between the handle mechanism 3 and the door frame 1 needs to be fine-adjusted, the nut 39 can be rotated to move towards right, and then the rotating screw 38 can be rotated through tools to fine-adjust the safety gate. After adjustment, rotate the nut 39 to make the nut 39 close to one side of the door body 4.

Preferably, in the process of adjusting a width of the door rail mechanism 2, in order to reduce the friction between the door body 4 and the ground, and at the same time support the door body 4 to make the width adjustment of the door rail mechanism 2 smoother, lower side of one door body 4 is provided with a wheel 25, and the wheel 25 and the handle mechanism 3 are located on same door body 4. The wheel 25 is fixed on the door body 4 through screws.

The working principle of the present utility patent is as follows:

when the safety gate is installed, the user can firstly hinge a bracket (second bracket) with the door rail mechanism 2 through the hinge shaft 26 and the rotating shaft sleeve 27; then fix this bracket in one side wall of external door frame through fixing pieces such as screws; then fix other bracket (first bracket) on other side wall of the external door frame; then separate the bolt structure 8 from the fixing holes 6 of the two door bodies through rotating the bolt structure 8; then move one door body 4 with handle 13 (first door body) along a width direction to adjust as suitable width; then rotate the bolt structure 8 to make the bolt structure 8 penetrate through the first threaded hole 10, the fixing hole 6 of one door body 4, the pocket hole 11 and the fixing hole 6 of the other door body 4 in sequence, and then abut against the concave groove; and then it is able to use tools to rotate the rotating screw 38 to achieve the fine adjustment from the door rail mechanism 2 to the door frame 1, so that the limiting convex block 21 is capable of inserting into the limiting hole on the fixing sleeve 12, thereby completing the installation of the safety gate. The above installation sequence is not unique, the user can adjust according to his habit.

The above only aims to illustrate the technical solution of the present utility patent without limitation. Any other modifications or equivalent replacements of the technical solution of the present utility patent made by ordinary skilled in the art should be included in the scope of the claims of the present utility patent as long as they do not deviate from the technical solution spirit and scope of the present utility patent.

The invention claimed is:

1. A safety gate comprising: a door frame, a door rail mechanism and a handle mechanism, wherein one side of the door rail mechanism is hinged with the door frame, the door rail mechanism is detachably connected with the door frame through the handle mechanism; wherein the door rail mechanism comprises: two door bodies and a plurality of adjustment components;

one door body is overlapped with the other door body when the two door bodies are in a draw back state, one side of the one door body is hinged with the door frame, and the handle mechanism is arranged on the other door body;

the two door bodies are provided with a plurality of fixing holes matching to each other at intervals along a width direction; the plurality of adjustment components pass through the fixing holes on the two door bodies in sequence and are detachably connected with the fixing holes;

each adjustment component comprises: a fixed base and a bolt structure; the fixed base is provided with a guiding groove, a first thread hole and a pocket hole; one end of the one door body is fixedly connected with the fixed base; one side of the other door body is inserted into the guiding groove so that the other door body moves from left to right in the guiding groove; the first threaded hole and the pocket hole are arranged on two sides of the guiding groove and on the same straight line.

2. The safety gate according to claim 1, wherein the bolt structure passes through the first threaded hole, one of the plurality of fixing holes on the one door body, the pocket hole and one of the plurality of fixing holes on the other door body in sequence.

3. The safety gate according to claim 2, wherein the plurality of fixing holes are arranged on an upper and a lower sides of each door body, at least two adjustment components are provided; one adjustment components is arranged at an upper side of the door rail mechanism, and the other adjustment component is arranged at a lower side of the door rail mechanism.

4. The safety gate according to claim 3, wherein four adjustment components are provided; two adjustment components are respectively fixed at upper and lower ends of a right side of the one door body, and another two adjustment components are respectively fixed at upper and lower ends of a left side of the other door body.

5. The safety gate according to claim 1, wherein the handle mechanism comprises: a fixing sleeve, a handle, a spring buckle, a button and a return spring; the fixing sleeve is installed at an upper end of one side of the door frame, the handle is fixedly arranged on the one door body; a sliding groove is arranged on one side of the handle close to the fixing sleeve, the spring buckle is arranged in the sliding groove and one end of the spring buckle extends out of the sliding groove to detachably connect with the fixing sleeve; the button is slidingly installed on the handle and one end is abutted against the spring buckle, the button is used for pushing the spring buckle to retract into the sliding groove and separate from the fixing sleeve; the return spring is arranged in the sliding groove, two ends of the return spring are fixedly connected with the spring buckle and the handle respectively.

6. The safety gate according to claim 5, wherein two slopes are respectively arranged on two sides of the spring buckle, and two inclined surfaces are respectively arranged on two sides of a lower end of the button to abut against the slopes.

7. The safety gate according to claim 6, a triangular groove is arranged on front and back sides of the spring buckle, and the triangular groove is located below the two slopes, the handle mechanism further comprises: a pressing piece and an elastic piece;

wherein the pressing piece is arranged at a lower side of the handle;

wherein the elastic piece is arranged inside the handle to provide restoring force for resetting the pressing piece, an inserting rod is arranged on the pressing piece, and one end of the inserting rod is capable of abutting against a right side of the spring buckle or inserting into the triangular groove.

8. The safety gate according to claim 7, a plurality of stripe holes are arranged on side walls of the upper and lower ends of the one door body, the handle mechanism further comprises: a limiting sleeve, a second connecting piece and a limiting slider;

the limiting sleeve is arranged at a lower end of the door frame, the limiting sleeve and the fixing sleeve are located on the same side of the door frame, a limiting groove is arranged on the limiting sleeve;

the limiting slider is arranged at the lower end of the one door body;

the second connecting piece is slidingly assembled inside one of the plurality of stripe holes at the lower end of the one door body, the second connecting piece is connected with the limiting slider.

9. The safety gate according to claim 8, a movable groove is respectively arranged inside each door body along a vertical direction to connect with the plurality of stripe holes, the handle mechanism further comprises: a sliding rod and a first connecting piece;

wherein the sliding rod is slidingly assembled inside the movable groove up and down, the elastic piece is arranged inside the movable groove and located at an upper end of the sliding rod;

the first connecting piece is slidingly assembled inside the stripe hole at an upper end of the one door body, the upper end of the sliding rod is connected with the pressing piece through the first connecting piece, a lower end of the sliding rod is connected with the second connecting piece;

when the pressing piece is pressed upwards, the pressing piece drives the sliding rod to move upwards through the first connecting piece, thereby driving the limiting slider to slide upwards; when the pressing piece is released, the elastic piece pushes the sliding rod to slide downwards under the action of its own restoring force, thereby driving the limiting slider and the pressing piece to slide downwards and reset.

10. The safety gate according to claim 5, a limiting hole is arranged on a bottom side of the fixing sleeve; a limiting convex block is arranged on a bottom side of the handle to insert into the limiting hole.

11. The safety gate according to claim 1, upper and lower ends of a right side of the one door body are provided with second threaded holes, the handle mechanism is arranged at an upper end of a left side of the other door body, upper and lower ends of a right side of the door frame are provided with a plurality of rotating shaft sleeves;

the rotating shaft sleeve on the upper end of the right of the door frame is equipped with a hinge shaft for horizontal rotation, one end of the hinge shaft is provided with an installation head, and the installation head is limited outside of the rotating shaft sleeve on the upper end of the right of the door frame, the installation head is provided with a through hole; the safety gate further comprises: a rotating screw, wherein the rotating screw is penetrated with the through hole and is meshed with the second threaded hole, one end of the rotating screw is limited outside the through hole.

12. The safety gate according to claim 11, a nut is arranged on the rotating screw to mesh with the rotating screw.

13. The safety gate according to claim 1, a wheel is arranged at a lower side of the one door body, and the wheel and the handle mechanism are located on the same one door body.

* * * * *